United States Patent
Latarnik et al.

Patent Number: 5,415,468
Date of Patent: May 16, 1995

[54] CIRCUIT CONFIGURATION AND METHOD FOR CONTROLLING A TRACTION SLIP CONTROL SYSTEM WITH BRAKE AND/OR ENGINE MANAGEMENT

[75] Inventors: Michael Latarnik, Friedrichsdorf; Alexander Kolbe, Gross Zimmern; Klaus Honus, Frankfurt am Main, all of Germany

[73] Assignee: Alfred Teves GmbH, Frankfurt, Germany

[21] Appl. No.: 50,461

[22] PCT Filed: Nov. 7, 1991

[86] PCT No.: PCT/EP91/02108
§ 371 Date: Sep. 7, 1993
§ 102(e) Date: Sep. 7, 1993

[87] PCT Pub. No.: WO92/08629
PCT Pub. Date: May 29, 1992

[30] Foreign Application Priority Data
Nov. 17, 1990 [DE] Germany .............. 40 36 742.8

[51] Int. Cl.$^6$ .............. B60T 8/32; B60K 28/16
[52] U.S. Cl. .............. 303/100; 180/197; 188/181 C; 303/96; 303/103
[58] Field of Search .............. 303/100, 92, 91, 93, 303/102-111, 96-98; 188/181 C, 181 A; 364/426.01, 426.02, 426.03; 180/197

[56] References Cited

U.S. PATENT DOCUMENTS

| | | | |
|---|---|---|---|
| 4,545,623 | 10/1985 | Sato et al. | 303/92 |
| 4,844,557 | 7/1989 | Giers . | |
| 5,015,042 | 5/1991 | Yoshino | 303/100 X |
| 5,200,897 | 4/1993 | Makino et al. | 303/103 X |

FOREIGN PATENT DOCUMENTS

| | | |
|---|---|---|
| 0293561 | 12/1988 | European Pat. Off. . |
| 3618867 | 12/1986 | Germany . |
| 89/04783 | 6/1989 | WIPO . |

Primary Examiner—Douglas C. Butler
Attorney, Agent, or Firm—Ratner & Prestia

[57] ABSTRACT

A circuit configuration and method for a traction slip control system which evaluates the speed ($v_{ER}$) measured at a driven spare wheel with a correction factor K(t) in order to maintain or improve the control function even when a smaller size spare wheel has been mounted. This correction factor (K(t)) is determined by axlewise comparison of the rotating speeds ($v_{na1}$, $v_{na2}$; $v_a$, $v_{ER}$) of the wheels of one axle and by comparison of the speed differences measured on the driven and non-driven axles, with traction slip control being inactive. Upon transition from a very slippery road surface ($\mu_{low}$ homogeneous) to a dry road surface ($\mu_{high}$ homogeneous), without any prior determination of the correction factor, the slip threshold (S) is raised temporarily. When starting with different right/left friction coefficients ($\mu$-split), with the spare wheel being mounted on the high friction coefficient side, a higher slip threshold ($S_{ER}$) will be effective for this spare wheel.

28 Claims, 3 Drawing Sheets

CIRCUIT CONFIGURATION AND METHOD FOR CONTROLLING A TRACTION SLIP CONTROL SYSTEM WITH BRAKE AND/OR ENGINE MANAGEMENT

This application is the U.S. national-phase application of PCT International Application No. PCT/EP91/02108 filed Nov. 7, 1991.

BACKGROUND OF THE INVENTION

This invention relates to a circuit configuration and method for maintaining or improving the control function for a traction slip control system with brake and/or engine management for automotive vehicles when a smaller spare wheel has been mounted as a driven wheel instead of a normal size wheel. In the present invention, the rotating speed of the driven wheels is compared with the vehicle speed or with a corresponding measurement parameter for the purpose of detecting the traction slip. A correction factor is obtained from the rotating speeds measured with stable rotational behavior of the wheels. Traction slip control is triggered when wheel slip exceeds a predetermined limit value, namely the so-called slip threshold.

There are known circuit configurations for traction slip control systems. The information needed for control is obtained by means of wheel sensors, important information being developed from the comparison of the rotational behavior of the individual wheels and by distinguishing between the driven wheels and the non-driven wheels.

Replacing a normal wheel by an emergency wheel of the type in current use today, the dimensions of which often differ considerably from those of normal wheels, can lead to faulty information for traction slip control.

What, above all, is critical is the replacement of a driven wheel by an emergency wheel, the diameter of which is smaller than the diameter of the normal wheel. The traction slip control system identifies the higher rotating speed of the emergency wheel, caused by the smaller diameter, as "traction slip", with the control system responding and metering braking pressure into the wheel brake of the emergency wheel. This metering-in of braking pressure may completely prevent the car from starting in some situations such as in case of different right/left friction coefficients when the emergency wheel is located on the higher friction coefficient side. Up to now, in order to avoid this situation, it was necessary to turn off the traction slip control when an emergency wheel has been mounted.

SUMMARY OF THE INVENTION

It is thus an object of this invention to overcome these disadvantages linked with using emergency wheels in vehicles with a traction slip control system.

It has been found that this object can be achieved by a circuit configuration and method by which the correction factor is determined by axle-wise comparison of the rotating speeds of the two wheels of one axle and by comparing the speed differences measured on the driven axle and on the non-driven axle. The rotating speed measured at the spare wheel is evaluated by means of the correction factor and is thereby adapted to the measured value of the rotating speed of the second driven wheel of the same axle, so that the slip threshold, decisive for traction slip control, will become the same for the spare wheel as for a normal wheel.

Control will be improved in this way when, during the start or in a certain phase, traction slip control is not immediately activated. Thus the control system has sufficient time to determine the correction factor and effect a corresponding adaptation. If, however, traction slip control is activated at once when, for example, starting on a very slippery road surface, a variant of the inventive circuit configuration and method will become operative. In this arrangement of the invention, at first, the same slip threshold is decisive for the control of the two driven wheels upon the onset traction slip control whereupon the slip threshold is raised until pressure reduction comes about if, during a traction slip control operation, pressure reduction signals fail to appear after a predetermined period of time. If, during a period of time of the magnitude ranging from 200 to 500 msec, only braking pressure reduction takes place, this will be an indication of the completion of the traction slip control operation. Thereupon, the slip threshold will be lowered again stepwise or continuously to the normal slip threshold. At the same time, it will again be possible to determine a correction factor in the afore-described manner, which correction factor serves to evaluate the rotating speed of the faster smaller emergency wheel.

Finally, there is provided yet another variation of the inventive circuit configuration and method when different left/right friction coefficients exist during a starting operation, one wheel becoming unstable and the smaller spare wheel being located on the higher friction coefficient side. For the purpose of maintaining or improving the control function, according to this arrangement of the invention, the slip threshold, decisive for the spare wheel, is raised up to the amount of deviation of the rotating speed of this spare wheel from the rotating speed of the non-driven normal wheels. The rise takes place with a predetermined gradient limited to approximately 0.6 ... 0.8 g.

Further characteristics, advantages and applications of the present invention will become evident from the following description, reference being made to the accompanying drawings.

DETAILED DESCRIPTION OF THE INVENTION

Figure 1:
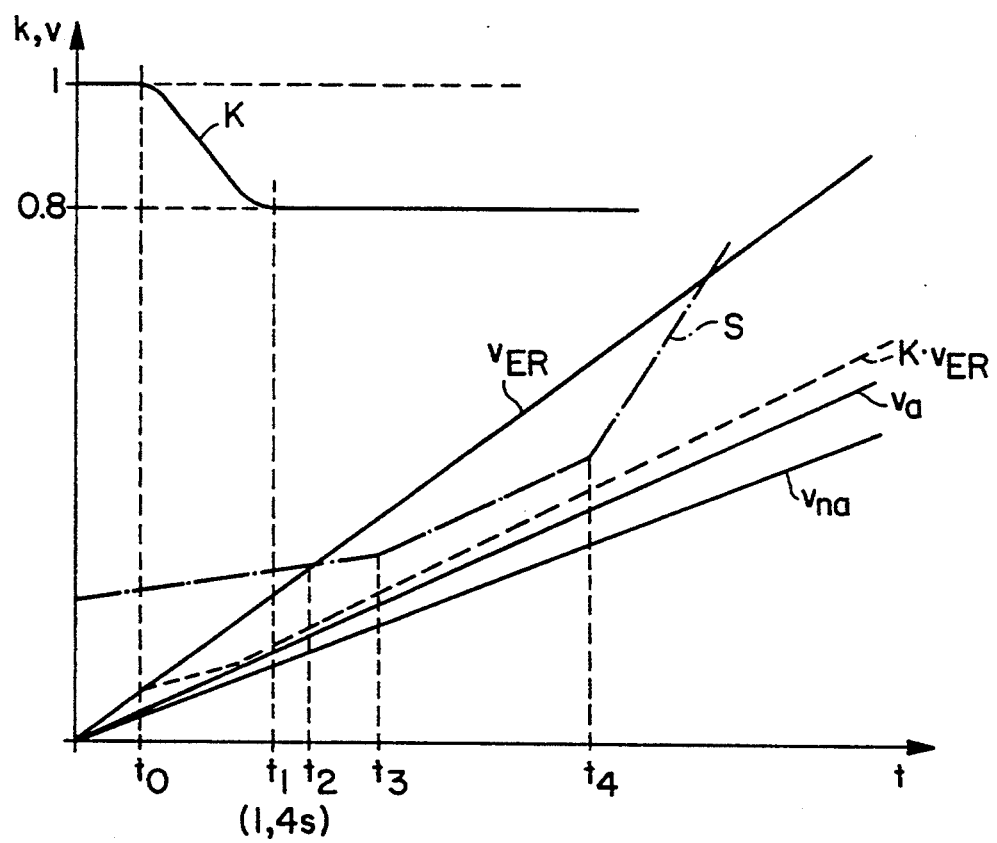
FIG. 1 shows the speed variation, as a function of time, of the vehicle wheels during a starting operation, with traction slip control not being activated.
Figure 2:
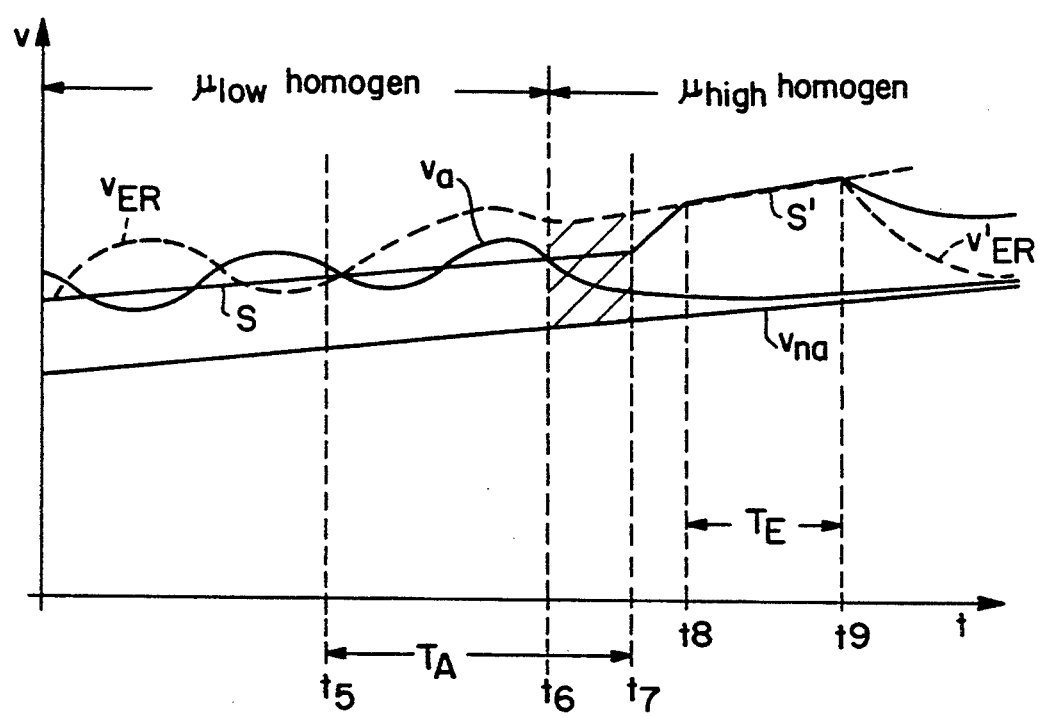
FIG. 2 shows the speed variation, as a function of time, of the vehicle wheels during a traction slip control operation and with a transition from low friction coefficients on both sides to high friction coefficients on both sides.
Figure 3:
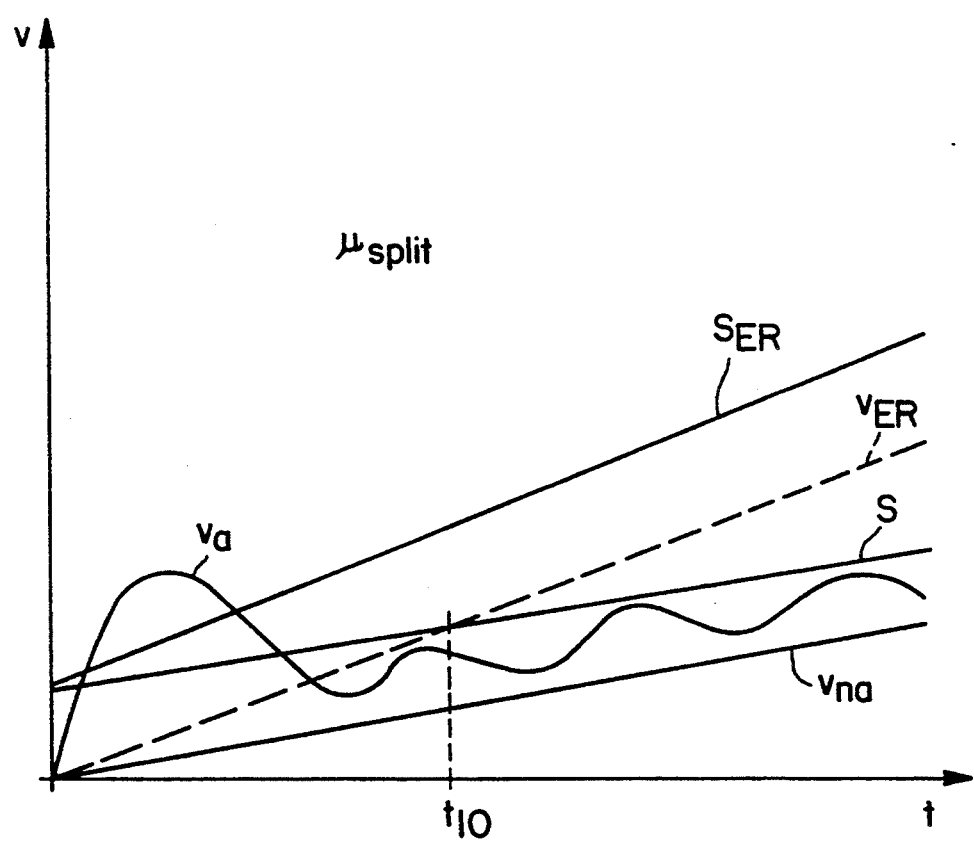
FIG. 3 shows the speed variation, as a function of time, of the vehicle wheels during a starting operation and with different left/right friction coefficients ($\mu$-split)

All the FIGS. 1, 2 and 3 are based on measurements taken in an automotive vehicle with a driven axle and a non-driven axle. Each wheel is equipped with an individual wheel sensor. In all cases, the control system is a traction slip control system with brake management which can be expanded by an engine management system if required. In all cases, a spare wheel is mounted instead of a driven normal wheel. The diameter of the spare wheel is only about 80% of the normal wheel diameter. In such cases, i.e., when a considerably smaller spare wheel is mounted on the driven axle, the result has had such grave implications for a traction slip control system that, up to now, the control had to be put out of operation.

FIG. 1, on the one hand, shows the speed of a non-driven wheel $v_{na1}$ or $v_{na2}$. Upon starting, as slip is practically nil, this speed corresponds to the vehicle speed. On the other hand, there are shown the speed of the driven normal wheel $v_a$ and the speed of the spare wheel $v_{ER}$. Finally, the evaluated or, rather, the corrected speed of the spare wheel $K(t) \cdot v_{ER}$ is shown in FIG. 1. Besides these wheel speeds, FIG. 1 shows the variation of the correction factor $K(t)$ during such a starting operation, with traction slip control not being activated.

In FIG. 1, a dash-dot line indicates the variation of the so-called "slip threshold" S which is defined by the spacing between the dash-dot line S and the vehicle speed represented by the speed of a non-driven wheel $v_{na}$. For the sake of facilitating the start, in the present example, the slip threshold S begins at a relatively high slip value such as of 6 km/h, thereupon continuously decreasing to approximately 3 km/h. In this example, this value will be reached at time $t_3$ when the speed $v_{na}$ of the vehicle will have gone up to about 20 km/h. Subsequently, the slip threshold will stay constant until time $t_4$, when the vehicle speed will have reached 60 km/h, and thereafter increases further. The optimal variation of the slip threshold will depend on the respective vehicle type.

The process of adaptation or, rather, the correction of the speed $v_{ER}$, measured at the spare wheel, will start at time $[t] \ t_0$ and will practically have been completed at time $t_1$ which, in the present example, will be after 1.4 seconds. The precondition of this "learning process" is that the traction slip control system will remain inactivated for a sufficient period of time during the starting operation. By means of axle-wise comparison of the speeds at the driven and non-driven wheels in accordance with the relationship:

$$\Delta = (K \times v_{ER} - v_a) - B(v_{na1} - v_{na2})$$

and by comparing the differences measured on the two axles, the correction factor K or, rather, $K(t)$ is "learned" during the starting operation when there is no excessive slip putting traction slip control into operation. "B" is a constant whose value is "1" in this example. Generally, the value of "B" lies between 0.3 and 1.0. If the result of this formation of differences in accordance with relationship (1) respectively exceeds zero or equals zero, $K(t_1)$ will be corrected by the factor $k_1$ after period of time $T_1$. In other words, if:

$\Delta \geq 0$, then $K(t) = K(t - T_1) - k_1$.

Correspondingly, if:

$\Delta < 0$, then $K(t) = K(t - T_2) + k_2$ will apply.

Expediently, identical correction intervals $T = T_1 = T_2$ and identical correction constants $k = k_1 = k_2$ are chosen. In one example, the correction interval T was chosen to be a period of time of 50 to 100 msec and the correction value k was selected to be a value ranging between $k = 0.005$ and $k = 0.01$.

From FIG. 1, it can be seen that, without any correction of the speed $v_{ER}$, the spare wheel would reach the slip threshold S at time $t_2$. Thus, the control logic would erroneously signal the existence of excessive traction slip at time $t_2$ and meter braking pressure into the wheel brake of the respective wheel so as to reduce this apparent traction slip. According to this invention, such an undesired reaction of the traction slip control system will be prevented by a circuit configuration and method which determines a correction factor $K(t)$ and uses the same to evaluate the rotating speed, measured at the spare wheel, in accordance with the above relationship (1). As of time $t_1$, at the latest, the excessive speed of the smaller spare wheel or emergency wheel will have been compensated to such an extent as to ensure that the slip threshold S will be suited without any alteration also for evaluating the rotational behavior of this spare wheel so that, at a later time, traction slip control at the spare wheel will, indeed, not come about before the desired time or only when a predetermined traction slip value will have been exceeded.

FIG. 2 illustrates a situation in which, before activating traction slip control, there is not sufficient time available for "learning" the correction factor $K(t)$ or rather for adapting the circuitry to the spare wheel in the manner described with reference to FIG. 1. The slip threshold S (i.e. the spacing between the line S and the vehicle speed represented by the speed of a non-driven wheel $v_{na}$) may, for instance, be reached and exceeded very fast when starting on an icy road—$\mu_{low}$ homogeneous. This is indicated by the zone on the left of FIG. 2. The speed variation $v_a$ of the driven normal wheel, as well as the speed variation $v_{ER}$ of the spare wheel, show a typical control behavior, the diameter of the spare wheel of this example also being 80% of the normal wheel diameter.

The troublesome effect of control by the smaller diameter of the spare wheel will be felt, in the present example, after time $t_6$. After time $t_6$, the vehicle or, rather, the driven wheels will enter a high friction coefficient zone marked $\mu_{high}$ homogeneous in FIG. 2. The speed $v_a$ of the driven normal wheel will go below the slip threshold at time $t_6$ and will subsequently remain in the stable zone. Speed $v_a$ approaches speed $v_{na}$ of the non-driven wheels. Because of the smaller diameter, the uncorrected speed $v_{ER}$ of the spare wheel, however, will stabilize on a value above the slip threshold S determined for the normal wheel size. As a consequence, again, there would be an undesired metering-in of braking pressure. This condition will be recognized by the inventive circuit configuration and method because of the failure of braking pressure reduction signals to appear at the spare wheel. This situation will prevail after time period $T_A$, i.e. after time $t_7$. Time period $T_A$, for example, will be approximately 1 sec. Consequently, as of time $t_7$, the control unit will raise the slip threshold S until braking pressure reduction signals will appear at the spare wheel. This will be the case at time $t_8$ as shown in FIG. 2. After time $t_8$, the slip threshold S', at first, will remain constant on the higher level and will again be lowered if no renewed pressure build-up will have become necessary after the expiration of a certain period of time $T_E$, such as 200 to 400 msec, after the first onset of the pressure reduction pulses. After this period of time $T_E$ or, rather, at time $t_9$, the control unit will have determined that traction slip control will be over and will initiate a relatively slow downgrading of the slip threshold S' to the original normal value S. Now follows a phase of inactivated traction slip control and the "learning process" will set in as described with reference to FIG. 1. The broken characteristic line $v_{ER}$ represents this wheel variation. In this learning phase, as described, the speed $v_{ER}$ of the spare wheel will be lowered by the correction factor K(t) so that the normal slip threshold S will become decisive for the spare wheel, too.

FIG. 3 relates to another situation in which, without the aid of the inventive circuit configuration and method, a smaller spare wheel would disturb the traction slip control system or put it out of operation. In this case, the friction coefficients at the two driven wheels of one axle are very different during the starting operation, i.e. the μ-split situation. The smaller diameter spare wheel is mounted on the higher friction coefficient side. FIG. 3 shows the speed $v_{na}$ of the non-driven wheel which represents the vehicle speed, the speed $v_a$ of the driven normal wheel which is influenced by traction slip control, the speed $v_{ER}$ of the stable-running spare wheel and the slip threshold S.

At time $t_{10}$, the speed $v_{ER}$ of the spare wheel will exceed the slip threshold S. This would result in a metering-in of braking pressure into the wheel brake of the stable spare wheel running on a high friction coefficient. In such a case, however, according to the present invention, the normal slip threshold S will be raised to the slip threshold $S_{ER}$ for the spare wheel running on the higher friction coefficient. The difference between the normal slip threshold S and the slip threshold $S_{ER}$ of the spare wheel will compensate for the difference in the rotating speeds of the normal wheel and of the smaller spare wheel so that, in this situation, braking pressure will be prevented from being metered into the wheel brake of the spare wheel and traction slip control may be performed only on the wheel with speed $v_a$ running on a low friction coefficient.

After the completion of traction slip control, in this case, there will also come about a correction by means of the circuit configuration and method described with reference to FIG. 1, whereupon, again, the same slip threshold may apply to the two driven wheels.

Figure 4:
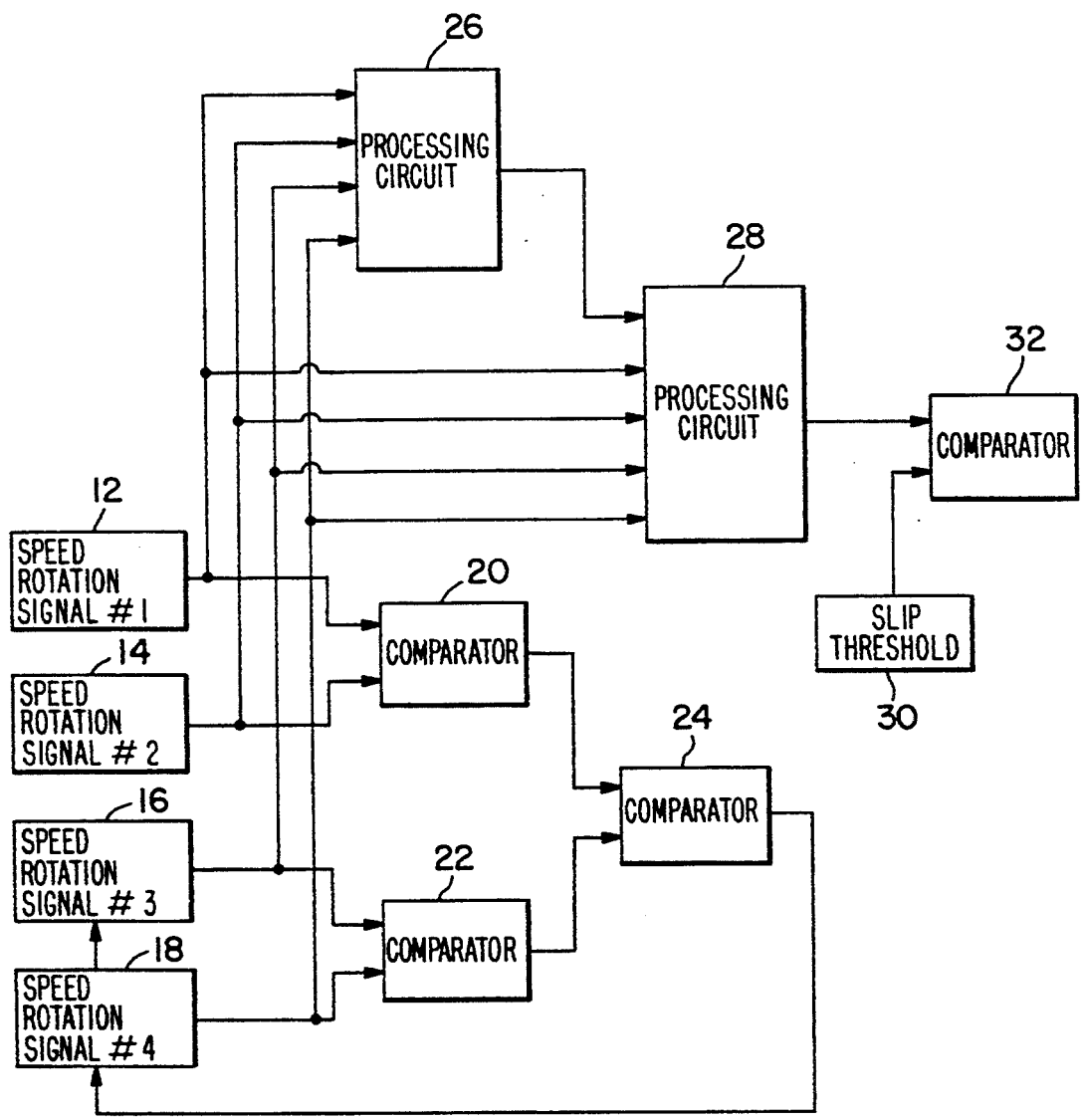
FIG. 4 is a block diagram of a circuit configuration constructed in accordance with the present invention.

The circuit configuration illustrated in FIG. 4, which represents one form of an apparatus for carrying out the control method of the present invention just described, includes means for developing speed rotation signals representative of the rotational speeds of the wheels of an automotive vehicle. Such means are represented by blocks 10, 12, 14 and 16, each of which can include a sensor, of conventional construction and operation, which senses the rotational behavior (i.e. speed) of an associated wheel and processing circuitry which produces a signal representative of the rotational behavior of the associated wheel. Block 18 represents the speed sensor and processing circuitry associated with a spare wheel of smaller diameter than normal mounted on the driven axle of the automotive vehicle. Block 16 represents the speed sensor and processing circuitry associated with the other wheel mounted on the driven axle. Blocks 12 and 14 represent the speed sensor and processing circuitry associated with the two wheels mounted on the non-driven axle.

The circuit configuration illustrated in FIG. 4 also includes means for developing a correction factor, prior to traction slip control from the speed rotation signals. Such means include, for the embodiment of the invention illustrated in FIG. 4, a first comparator 20 to which the speed rotation signals associated with the wheels on the non-driven axle are supplied and a second comparator 22 to which the speed rotation signals associated with the wheels of the driven axle are supplied. Comparator 20 develops a first difference signal representative of the difference in rotational speeds of the wheels mounted on the non-driven axle and comparator 22 develops a second difference signal representative of the difference in the rotational speeds of the wheels mounted on the driven axle. The difference signals developed by comparators 20 and 22 are supplied to a third comparator 24 which develops a correction factor signal representative of the difference between the difference in rotational speeds of the wheels mounted on the non-driven axle and the difference in the rotational speeds of the wheels mounted on the driven axle.

The circuit configuration illustrated in FIG. 4 further includes means for adapting the speed rotation signal representative of the rotational speed of the spare wheel by the correction factor signal to the rotational speed of the other wheel mounted on the driven axle. This is indicated by the connection from the output of the comparator 24 to block 18 at which the speed rotation signal, representative of the rotational speed of the spare wheel, is developed. The dashed line extending through block 18 to block 16 represents the mounting of the smaller than normal spare wheel on the driven axle to replace the other wheel mounted on the driven axle.

A first processing circuit 26 develops a vehicle speed signal, representative of the speed of the automotive vehicle, from the speed rotation signals in the usual manner. A second processing circuit 28 determines the onset of traction slip by comparing the rotational speeds of the wheels, represented by the speed rotation signals, including the adapted speed rotation signal of the spare wheel, with the vehicle speed, represented by the vehicle speed signal developed by processing circuit 26.

The circuit configuration illustrated in FIG. 4 finally includes means for establishing a slip threshold which must be exceeded before traction slip control can commence and means for comparing the output of processing circuit 28, representative of the onset of traction slip, with the slip threshold. Establishing the slip threshold is represented by a block 30 which can be any suitable means for setting a desired slip threshold in a comparator 32 to which the output from processing circuit 28 is supplied. When the output from processing circuit 28 exceeds the slip threshold, the output from comparator 32 permits slip control operation to commence.

We claim:

1. For an automotive vehicle having an undriven axle with two wheels mounted thereon and a driven axle with two wheels mounted thereon, one of said wheels mounted on said driven axle being a spare wheel which is smaller in diameter than a normal wheel, a method for controlling traction slip of said automotive vehicle comprising the steps of:

measuring the rotating speeds of said wheels;
developing a correction factor by:
(a) comparing the measurements of said rotating speeds of said wheels mounted on said undriven axle to determine the difference in said rotating speeds of said wheels mounted on said undriven axle,
(b) comparing the measurements of said rotating speeds of said wheels mounted on said driven axle to determine the difference in said rotating speeds of said wheels mounted on said driven axle, and
(c) comparing said difference in said rotating speeds of said wheels mounted on said undriven axle with said difference in said rotating speeds of said wheels mounted on said driven axle;

adapting said measurement of said rotating speed of said spare wheel by said correction factor to said measurement of said rotating speed of the other wheel mounted on said driven axle;

establishing a slip threshold representative of a traction slip level which must be exceeded before traction slip control can commence;

developing a measurement related to the speed of said automotive vehicle;

determining the onset of traction slip by comparing said measurements of said rotating speeds of said wheels, including the adapted measurement of said rotating speed of said spare wheel, with said measurement related to the speed of said automotive vehicle;

and initiating traction slip control by comparing the determination of the onset of traction slip with said slip threshold and determining when the determination of the onset of traction slip exceeds said slip threshold.

2. A method for controlling traction slip according to claim 1 wherein said correction factor is developed during start-up of the vehicle prior to traction slip control.

3. A method for controlling traction slip according to claim 2 wherein said correction factor is developed by stepwise adaptation.

4. A method for controlling traction slip according to claim 2 wherein said correction factor is developed by reduction of said differences with said correction factor included.

5. A method for controlling traction slip according to claim 2 wherein said correction factor is developed according to the following:

$$\Delta = (K \times v_{ER} - v_a) - f(v_{na1}, v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel with said correction factor reduced by a specific amount at predetermined time intervals of $\Delta$ is zero.

6. A method for controlling traction slip according to claim 5 wherein said correction factor is reduced by identical amounts if the predetermined time intervals are identical.

7. A method for controlling traction slip according to claim 6 wherein said time interval is within the range of 10 to 100 msec and said correction factor is limited to a range of 0.8 to 1.00.

8. A method for controlling traction slip according to claim 2 wherein said correction factor is developed according to the following:

$$\Delta = (K \times v_{ER} - v_a) - f(v_{na1}, v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel with said correction factor reduced by a specific amount at predetermined time intervals if $\Delta$ is greater than zero.

9. A method for controlling traction slip according to claim 8 wherein said correction factor is reduced by identical amounts if the predetermined time intervals are identical.

10. A method for controlling traction slip according to claim 9 wherein said time interval is within the range of 10 to 100 msec and said correction factor is limited to a range of 0.8 to 1.00.

11. A method for controlling traction slip according to claim 2 wherein said correction factor is developed according to the following:

$$\Delta = (K \times v_{ER} - v_a) \times f(v_{na1}, v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel with said correction factor raised by a specific amount at predetermined time intervals if $\Delta$ is greater than zero.

12. A method for controlling traction slip according to claim 11 wherein said correction factor is raised by identical amounts if the predetermined time intervals are identical.

13. A method for controlling traction slip according to claim 12 wherein said time interval is within the range of 10 to 100 msec and said correction factor is limited to a range of 0.8 to 1.00.

14. A method for controlling traction slip according to claim 13 wherein said correction factor is developed according to the following:

$$\Delta = (K \times v_{ER} - v_a) - B(v_{na1} - v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel
B is a constant within the range of 0.3 to 1.0.

15. A method for controlling traction slip according to claim 1 wherein said correction factor is developed according to the following:

$$\Delta = (K \times v_{ER} - v_a) - B(v_{na1} - v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel
B is a constant within the range of 0.3 to 1.0.

16. A method for controlling traction slip according to claim 1 wherein said correction factor is developed during normal driving of the vehicle prior to traction slip control.

17. A method for controlling traction slip according to claim 16 wherein said correction factor is developed by stepwise adaptation.

18. A method for controlling traction slip according to claim 16 wherein said correction factor is developed by reduction of said differences with said correction factor included.

19. A method for controlling traction slip according to claim 16 wherein said correction factor is developed according to the following:

$$\Delta = (K \times v_{ER} - v_a) - f(v_{na1}, v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel with said correction factor reduced by a specific amount at predetermined time intervals if $\Delta$ is zero.

20. A method for controlling traction slip according to claim 19 wherein said correction factor is reduced by identical amounts if the predetermined time intervals are identical.

21. A method for controlling traction slip according to claim 20 wherein said time interval is within the range of 10 to 100 msec and said correction factor is limited to a range of 0.8 to 1.00.

22. A method for controlling traction slip according to claim 16 wherein said correction factor is developed according to the following:

$$\Delta = (K \times v_{ER} - v_a) - f(v_{na1}, v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel with said correction factor reduced by a specific amount at predetermined time intervals if $\Delta$ is greater than zero.

23. A method for controlling traction slip according to claim 22 wherein said correction factor is reduced by identical amounts if the predetermined time intervals are identical.

24. A method for controlling traction slip according to claim 23 wherein said time interval is within the range of 10 to 100 msec and said correction factor is limited to a range of 0.8 to 1.00.

25. A method for controlling traction slip according to claim 16 wherein said correction factor is developed according to the following:

$$\Delta = (K \times v_{ER} \times v_a) - f(v_{na1}, v_{na2})$$

where:
$v_{ER}$ is the rotational speed of a driven wheel having a smaller than normal diameter
$v_a$ is the rotational speed of the second driven wheel
$v_{na1}$ is the rotational speed on one non-driven wheel
$v_{na2}$ is the rotational speed of the second non-driven wheel with said correction factor raised by a specific amount at predetermined time intervals if $\Delta$ is greater than zero.

26. A method for controlling traction slip according to claim 25 wherein said correction factor is raised by identical amounts if the predetermined time intervals are identical.

27. A method for controlling traction slip according to claim 26 wherein said time interval is within the range of 10 to 100 msec and said correction factor is limited to a range of 0.8 to 1.00.

28. For an automotive vehicle having an undriven axle with two wheels mounted thereon and a driven axle with two wheels mounted thereon, one of said wheels mounted on said driven axle being a spare wheel which is smaller in diameter than a normal wheel, a circuit configuration for controlling traction slip of said automotive vehicle comprising:

means for developing speed rotation signals representative of the rotating speeds of said wheels;

means for developing a correction factor signal prior to traction slip control; said means for developing said correction factor signal including:

(a) first comparison means responsive to said speed rotation signals representative of said rotating speeds of said wheels mounted on said undriven axle for developing a first difference signal representative of the difference in said rotating speeds of said wheels mounted on said undriven axle, (b) second comparison means responsive to said speed rotation signals representative of said rotating speeds of said wheels mounted on said driven axle for developing a second difference signal representative of the difference in said rotating speeds of said wheels mounted on said driven axle, and (c) third comparison means responsive to said first and said second difference signals for developing a correction factor signal representative of the between said difference in said rotating speeds of said wheels mounted on said undriven axle and said difference in said rotating speeds of said wheels mounted on said driven axle;

means for adapting said speed rotation signal representative of said rotating speed of said spare wheel by said correction factor signal to said speed rotation signal representative of said rotating speed of the other wheel mounted on said driven axle;

means for establishing a slip threshold representative of a traction slip level which must be exceeded before traction slip control can commence;

means for developing a vehicle speed signal representative of the speed of said automotive vehicle;

means for comparing said vehicle speed signal and said speed rotation signals, including the speed rotation signal representative of the rotating speed of said spare wheel adapted by said correction factor signal, to develop a signal representative of the onset of traction slip;

and means for comparing said signal representative of the onset of traction slip with said slip threshold to determine when the onset of traction slip exceeds said slip threshold.

* * * * *

UNITED STATES PATENT AND TRADEMARK OFFICE
CERTIFICATE OF CORRECTION

PATENT NO.   : 5,415,468
DATED        : May 16, 1995
INVENTOR(S)  : Latarnik et al.

It is certified that error appears in the above-identified patent and that said Letters Patent is hereby corrected as shown below:

In column 8, claim 11, line 16, delete
$$\Delta = (K \times v_{ER} - v_a \ X \ f(v_{na1}, v_{na2})$$
and substitute therefor
$$\Delta = (K \times v_{ER} - v_a - f(v_{na1}, v_{na2})$$

In column 10, claim 28, line 23, after the words "to traction slip control" delete ";" and substitute therefor --,--

Signed and Sealed this

Twelfth Day of September, 1995

Attest:

BRUCE LEHMAN

Attesting Officer

Commissioner of Patents and Trademarks